United States Patent [19]
Nakamura

[11] Patent Number: 5,765,155
[45] Date of Patent: Jun. 9, 1998

[54] MASTER DATA MANAGING METHOD

[75] Inventor: Kengo Nakamura, Tokyo, Japan

[73] Assignee: NEC Corporation, Tokyo, Japan

[21] Appl. No.: 934,749

[22] Filed: Sep. 22, 1997

Related U.S. Application Data

[63] Continuation of Ser. No. 438,406, May 10, 1995, abandoned.

[30] Foreign Application Priority Data

May 11, 1994 [JP] Japan ................. 6-097322

[51] Int. Cl.⁶ ..................................... G06F 17/30
[52] U.S. Cl. ............................. 707/10; 707/200
[58] Field of Search ........................ 707/10, 200

[56] References Cited

U.S. PATENT DOCUMENTS

| | | | |
|---|---|---|---|
| 4,891,785 | 1/1990 | Donohoo | 395/200.01 |
| 5,109,515 | 4/1992 | Laggis et al. | 707/10 |
| 5,329,619 | 7/1994 | Page' et al. | 395/200.01 |
| 5,386,525 | 1/1995 | Noack | 395/600 |
| 5,418,945 | 5/1995 | Carter et al. | 395/600 |
| 5,483,652 | 1/1996 | Sudama et al. | 395/600 |
| 5,495,607 | 2/1996 | Pisello et al. | 395/600 |
| 5,497,463 | 3/1996 | Stein et al. | 395/200.03 |
| 5,548,726 | 8/1996 | Pettus | 395/200.09 |
| 5,566,331 | 10/1996 | Irwin, Jr. et al. | 395/600 |
| 5,644,766 | 7/1997 | Coy et al. | 707/204 |

*Primary Examiner*—Wayne Amsbury
*Attorney, Agent, or Firm*—Young & Thompson

[57] ABSTRACT

In a network system in which a master computer holding the master data and a plurality of local computers are hierarchically connected through a communication line, when a terminal attached to any one of the local computers requests update for the master data, the master data is transmitted to the requesting local computer from the master computer through multiple local computers. Furthermore, in a network system in which a plurality of computers is connected through a loop communication line, and one of them holds the master data, when a terminal attached to any one of the computers requests update for the master data, the master data is transmitted to the requesting computer from a computer holding the master data.

8 Claims, 6 Drawing Sheets

Database Management Table

| 710 File name | 702 Comment on content | 703 CPU No. | 704 Dummy file name |
|---|---|---|---|
| a a a | | | |
| b b b | | | |
| FILE XXX | Dummy file name | MASTER | XXX.DMY |
| | | | |
| | | | |

Database Management Table

| 710 File name | 702 Comment on content | 703 CPU No. | 704 Dummy file name |
|---|---|---|---|
| a a a | | | |
| b b b | | | |
| FILE XXX | Dummy file name | MASTER | XXX.DMY |
| | | | |
| | | | |

MASTER DATA MANAGING METHOD

This application is a continuation of application Ser. No. 08/438,406, filed May 10, 1995, now abandoned.

BACKGROUND OF THE INVENTION

1. Field of the Invention

The invention relates to a method for managing master data held by a master computer in a network system in which the master computer and a plurality of other computers controlled by the master computer are connected through a communication line.

2. Description of the Related Art

Conventionally, in a network system where a plurality of computers is connected, master data has been always managed by a specific master computer. In updating the master data, the master computer receives an update request from a terminal attached to a computer, and returns the result of processing to that terminal.

Figure 8:
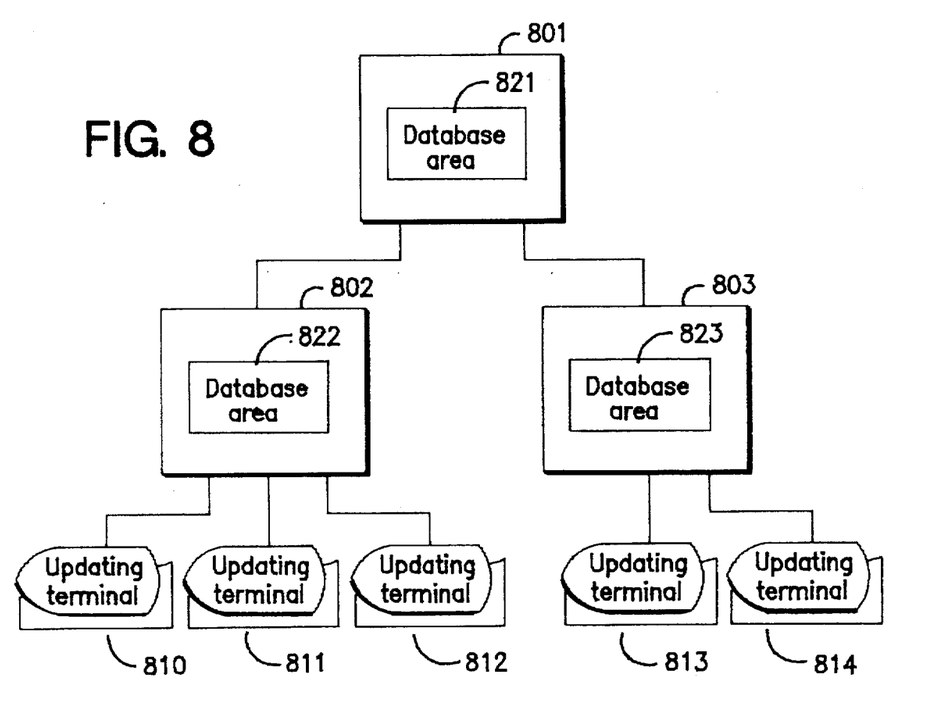
FIG. 8 is the configuration of a conventional network system.

FIG. 8 shows a conventional network configuration. Computers 801, 802, and 803 have database areas 821, 822, and 823 for storing portions of a database, respectively. The computers 801 and 802 are connected through a communication line 830, and the computers 801 and 803 are connected through a communication line 831. Terminals 810, 811, and 812 are attached to the computer 802, while terminals 813 and 814 are attached to the computer 803.

The method for managing master data in the conventional network system is described below.

It is assumed that the computer 803 is the master computer, and has a database area 823 containing master data.

When the terminal 810 issues an update request for the master data in the database area 823 in the computer 803, it is updated through the computers 802 and 801. When the master data is updated, the result of update for the master data is returned to the terminal 810 again through the computers 801 and 802.

When the terminal 813 issues an update request to the master data in the database area 823, because the terminal 813 is attached to the computer 803 having the database area 823, the master data in the database area 823 is updated without passing through any other computer. When the master data is updated, the result of update is returned to the terminal 813.

In the conventional master data managing method, the master data is always stored in the database area of a specific computer.

Accordingly, in the conventional master data managing method, an update request is not transmitted from a terminal attached to another computer to the master data unless it passes through a plurality of computers so that there arises a problem of delay in updating the master data.

In addition, because update requests from all terminals are concentrated on the master computer, there arises a problem that the master computer is loaded with a high load, and suffers from degradation of processing efficiency.

Furthermore, because update requests from all terminals are concentrated on the master computer, there arises a problem that the communication line connecting the master computer and other computers is loaded with a high load so that the response from the master computer is delayed.

SUMMARY AND OBJECTS OF THE INVENTION

An object of the invention is to efficiently process update requests for master data from all terminals attached to all computers constituting a network system.

Another object of the invention is not to delay response to update requests for master data from all terminals attached to all computers constituting a network system.

The first method for managing master data according to the invention is a method for managing master data in a network system in which a plurality of computers is connected through a communication line, and one of them holds the master data, wherein the computer performs desired processing to the master data in response to an update request for the master data when it holds the master data, or requests another computer holding the master data to transmit the master data when it does not hold the master data, and performs desired processing on the master data when it receives the master data from said another computer, the computer which is requested by another computer to transmit the master data transmitting the master data to the requesting computer.

The second method for managing master data according to the invention is a method for managing master data in a network system in which a plurality of computers is connected through a communication line, one of them holds the master data, and at least one terminal is attached to each computer, wherein the computer performs desired processing on the master data through a terminal attached thereto in response to an update request for the master data input from the terminal attached thereto when it holds the master data, or requests another computer holding the master data to transmit the master data when it does not hold the master data, and performs desired processing on the master data when it receives the master data from said another computer, and performs desired processing on the master data, the computer which is requested by another computer to transmit the master data transmitting the master data to the requesting computer.

The third method for managing master data according to the invention is a method for managing master data in a network system in which a master computer and at least one other computer controlled by the master computer are hierarchically connected through a communication line, each computer being attached with at least one terminal, wherein the master computer has a master database area containing the master data for each of users of the master computer and the other computer, the other computer having a common database area containing the master data for each of its users, after receiving an update request for the master data for a user input from the terminal attached thereto, when the master data for the user is held in the common database area, the other computer transmitting the master data to the requesting terminal for desired processing, after receiving an update request for the master data for a user input from the terminal attached thereto, when the master data for the user is not held in the common database area, the other computer transmitting the update request to a computer on higher level in the network, and, when it receives the master data from the computer on a higher level in the network, transmitting the master data to the requesting terminal for desired processing, after receiving an update request for the master data for a user from a computer on a lower level in the network, when the master data for the user is held in the common database area, the other computer transmitting the master data to the requesting computer, after receiving an update request for the master data for a user from a computer on a lower level in the network, when the master data for the user is not held in the common database area, the other computer transmitting the update request to a computer on a higher level in the network, and, when it receives the master data from the computer on a higher level in the network, transmitting the master data to the requesting computer, the master computer receiving an update request for the master data for a user from a computer on a lower level in the network, reading the master data for the user from the master database area, and transmitting it to the requesting computer.

The fourth method for managing master data according to the invention is a method for managing master data in a network system in which a master computer and at least one other computer controlled by the master computer are hierarchically connected through a communication line, each computer being attached with at least one terminal, wherein the master computer has a master database area containing an identifier and master data for each user of the master computer and the other computer, and the identification number of a computer managing the master data, the other computer having a common database area containing an identifier and master data for each of its users, and the identification number of a computer managing the master data, after receiving an update request for the master data for a user input from the terminal attached thereto, when the identifier for the user is held in the common database area, and the identification number for the computer holding the master data identifies the other computer itself, the other computer reading the master data from the common database area and transmitting it to the requesting terminal for desired processing, after receiving an update request for the master data for a user input from the terminal attached thereto, when the identifier for the user is not held in the common database area, the other computer transmitting the update request to a computer on a higher level in the network, when it receives the master data from the computer on a higher level in the network, setting the-identifier for the user, its identification number, and the master data in the common database area, and transmitting the master data to the requesting terminal for desired processing, after receiving an update request for the master data for a user from a computer on a lower level in the network, when the identifier for the user is held in the common database area, and the identification number for a computer holding the master data identifies the other computer itself, the other computer reading the master data from the common database area, transmitting it to the requesting computer, and setting the identification number of the requesting computer in the common database area, after receiving an update request for the master data for a user from a computer on a lower level in the network, when the identifier for the user is not held in the common database area, the other computer transmitting the update request to a computer on a higher level in the network, when it receives the master data from the computer on a higher level in the network, setting the identifier for the user and the identification number of the requesting computer in the common database area, and transmitting the master data to the requesting computer, after receiving an update request for the master data for a user from a computer on a lower level in the network, when the identifier for the user is held in the master database area, and the identification number for a computer holding the master data identifies itself, the master computer reading the master data from the master database area, transmitting it to the requesting computer, and setting the identification number of the requesting computer in the master database area, after receiving an update request for the master data for a user from a computer on a lower level in the network, when the identifier for the user is held in the master database area, and the identification number for another computer is held in the master database area, the master computer transmitting the update request to said another computer.

The fifth method for managing master data according to the invention is a method for managing master data in a network system in which a plurality of computers is connected through a loop communication line, each computer being attached with at least one terminal, wherein one of the computers holds the master data for users of the computers, an identifier for each of the users containing identification numbers for the computers, after receiving an update request for the master data for a user input from the terminal attached thereto, when the mater data for the user is held, the computer transmitting the master data to the requesting terminal for desired processing, after receiving an update request for the master data for a user input from the terminal attached thereto, when the mater data for the user is not held, the computer requesting a computer corresponding to the identification number contained in the identifier for the user to transmit the master data, and when it receives the master data from the holding computer, transmitting the master data to the requesting terminal for desired processing, after receiving an update request for the master data for a user from another computer, when the master data is held, the computer transmitting the master data to the requesting computer, after receiving an update request for the master data for a user from another computer, when the mater data for the user is not held, the computer requesting a computer corresponding to the identification number contained in the identifier for the user to transmit the master data, and when it receives the master data from the holding computer, transmitting the master data to the requesting computer.

The sixth method for managing master data according to the invention is a method for managing master data in a network system in which a plurality of computers is connected through a loop communication line, each computer being attached with at least one terminal, wherein one of the computers holds the master data for users of the computers, the computer having a database management table for each user registered thereto, the database management table containing an identifier for the user, the file name of master data for the user, and the identification number of a computer holding the master file, the identifier for the user containing the identification numbers of the computers, after receiving an update request for the master data for a user input from the terminal attached thereto, when the computer has the database management table corresponding to the identifier for the user, and the identification number of a computer holding the master file contained in the database management table identifies the computer itself, the computer transmitting the master file to the requesting terminal for desired processing, after receiving an update request for the master data for a user input from the terminal attached thereto, when the computer does not have the database management table corresponding to the identifier for the user, the computer requesting a computer corresponding to the identification number contained in the identifier to transmit the master data, when it receives the master data from the corresponding computer, creating the database management table for the user, setting the identifier of the user, the file name of the master file, and its identification number in the table, and transmitting the master data to the requesting terminal for desired processing, after receiving an update request for the master data for a user from another computer, when the computer has the database management table corresponding to the identifier for the user, and the identification number of a computer holding the master file contained in the database management table identifies the computer itself, the computer transmitting the master file to the requesting computer, after receiving an update request for the master data for a user from another computer, when the computer does not have the database management table corresponding to the identifier for the user, the computer requesting a computer corresponding to the identification number contained in the identifier for the user to transmit the master data, when it receives the master data from the corresponding computer, creating the database management table for the user, setting the identifier of the user, the file name of the master file, and the identification number of the requesting computer in the table, and transmitting the master data to the requesting computer.

BRIEF DESCRIPTION OF THE DRAWINGS

The invention will be understood more fully from the detailed description given here below and from the accompanying drawings of preferred embodiments of the invention, which, however, should not be considered as limiting the invention but are for explanation and understanding only.

Here, it should be noted that like reference numerals represent like elements throughout the disclosure.

DETAILED DESCRIPTION OF THE PREFERRED EMBODIMENT

Now, embodiments of the invention will be described in detail with reference to the attached drawings.

Figure 1:
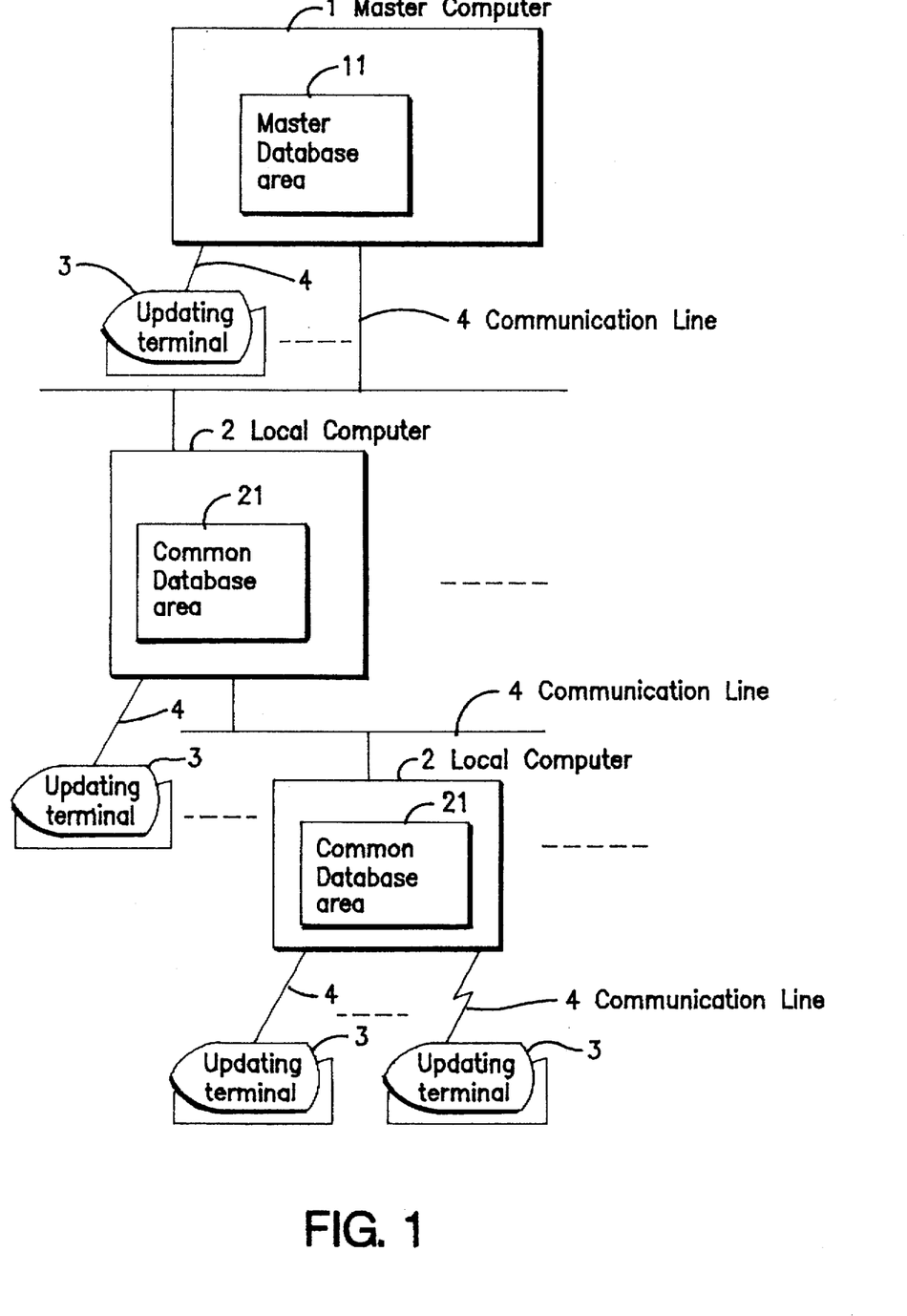
FIG. 1 is the configuration of a network system to which the mater data managing method of the invention is applied.

FIG. 1 shows the configuration of a network system to which the mater data managing method of the invention is applied.

A master computer 1 is connected to a plurality of local computers 2 through a communication line 4, and each computer is connected to an updating terminal 3 also through the communication line 4; The master computer 1 has a master database area 11, while the local computer 2 has a common database area 21.

The first embodiment of the invention will be described with reference to FIGS. 2–4, and 9.

The first embodiment is a credit updating terminal management system which is a system dispensing cash when a credit card is passed through an updating terminal such as a cash register terminal or a cash dispenser terminal installed in one of retail stores throughout the country.

Figure 2:
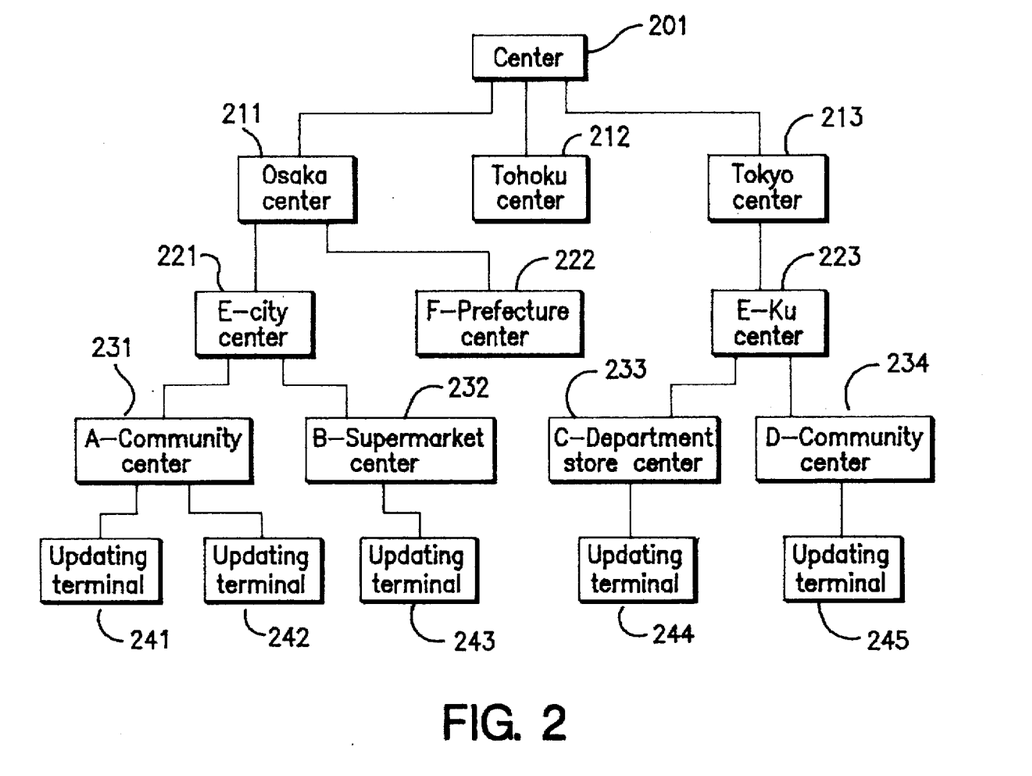
FIG. 2 is the configuration of a network system to which the mater data managing method according to the first embodiment of the invention is applied.

FIG. 2 shows the configuration of a network system to which the mater data managing method according to the first embodiment of the invention is applied.

A center computer 201 is a master computer, while region center computers 211–213 installed in each region, area center computers 221–223 installed in each prefecture or city, and group computers 231–234 installed in department stores or supermarkets are local computers. Updating terminals 241–245 are ID card input terminals which are cash registers or cash dispensers attached to the group computers 231–234 and installed in each store.

Figure 3:
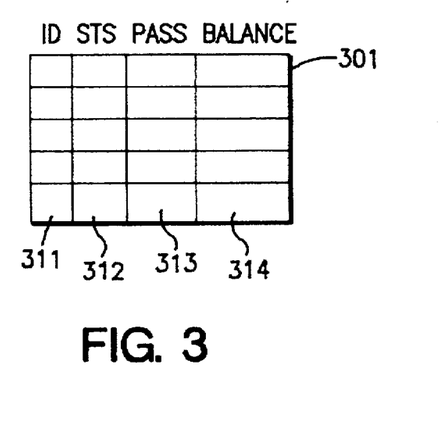
FIG. 3 is content of a common data table 301 of the first embodiment of the invention.
Figure 4:
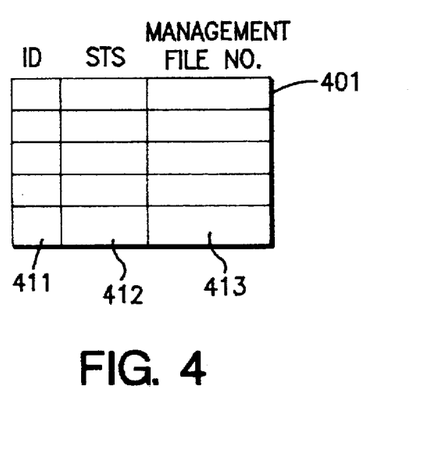
FIG. 4 is content of a master data table 401 of the first embodiment of the invention.

The group computers 231–234 have a common data table 301 as a common database area 21, as shown in FIG. 3, while the center computer 201 has a master data table 401 as a master database area 11, as shown in FIG. 4.

Referring to FIG. 3, an entry (row) of the common data table 301 consists of an ID area 311 (ID in FIG. 3) in which the personal registration number of a customer is registered, a status area 312 (STS in FIG. 3) in which the identification number of a computer holding information indicating whether or not the personal data of the customer exists in the entry or the personal data is set, a password area 313 (PASS in FIG. 3), and a balance area 314 (Balance in FIG. 3).

Referring to FIG. 4, an entry of the master data table 401 consists of an ID area 411 (ID in FIG. 4) in which the personal registration number of a customer is registered, a status area 412 (STS in FIG. 4) in which the identification number of a computer holding information indicating whether or not the personal data of the customer exists in the entry or the personal data is set, and a managing file number address area 413 (Managing File No in FIG. 4) in which a file number indicating a storage location of personal data (address, password, balance, etc.) is set.

Registration of a new customer in the master database area 11 of the center computer 201 is carried out as follows.

A personal registration number IDn of the customer is registered in the ID area 411 of the master data table 401 in the master database area 11. A value indicating existence of personal data of the customer is set in the status area 412 in the entry. Also, a file number of managing file storing the personal data of the customer is set in the managing file number address area 413 in the entry.

Figure 9:
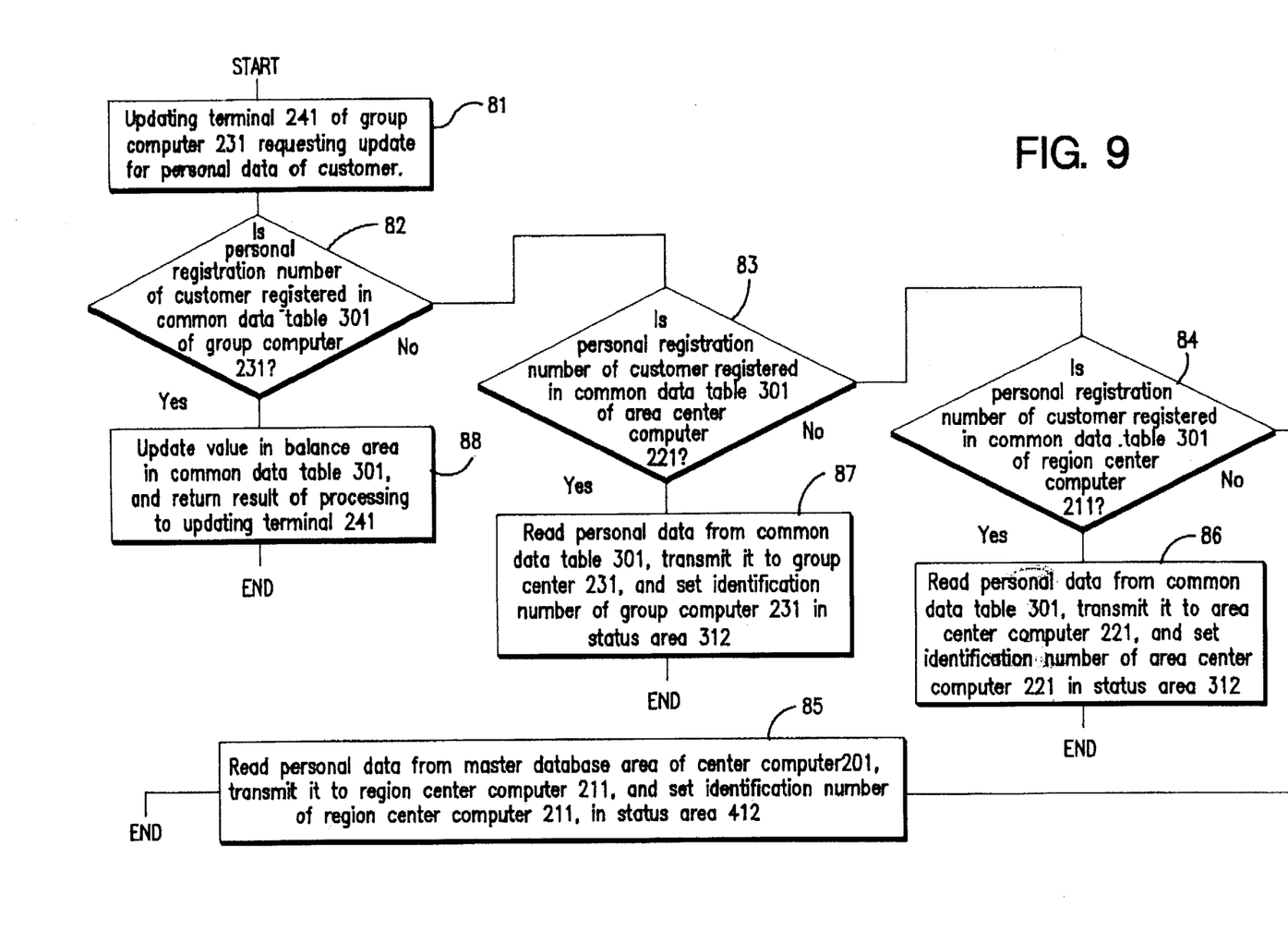
FIG. 9 is a flowchart illustrating the process of the master data managing method according to the first embodiment of the invention.

When update for the personal data for the customer with the personal registration number IDn is requested from the updating terminal 241 attached to the group computer 231 (step 81), the group computer 231 receives the update request, and determines whether or not the personal registration number IDn of the customer is registered in the ID area 311 of the common data table 301 in its common database area 21 (step 82).

If not, the group computer 231 requests the area center computer 221 to transmit the data of the customer with the personal registration number IDn.

The area center computer 221 which is requested by the group computer 231 to transmit the personal data of the customer with the personal registration number IDn determines whether or not the personal registration number IDn of the customer is registered in the ID area 311 of the common data table 301 in its common database area 21 (step 83).

However, because the personal registration number IDn is also not registered in the ID area 311 of the common data table 301 in the common database area 21 of the area center computer 221, the area center computer 221 requests the region center computer 211 to transmit the personal data of the customer with the personal registration number IDn.

The region center computer 211 which is requested by the area center computer 221 to transmit the personal data of the customer with the personal registration number IDn determines whether or not the personal registration number IDn of the customer is registered in the ID area 311 of the common data table 301 in its common database area 21 (step 84).

However, because the personal registration number IDn is also not registered in the ID area 311 of the common data table 301 in the common database area 21 of the region center computer 211, the region center computer 211 requests the center computer 201 to transmit the personal data of the customer with the personal registration number IDn.

The center computer 201 which is requested by the region center computer 211 to transmit the personal data of the customer with the personal registration number IDn determines whether or not the personal registration number IDn of the customer is registered in the ID area 411 of the master data table 401 in its master database area 11.

Because the personal registration number IDn of the customer is registered in the ID area 411 of the master data table 401 in the master database area 11 of the center computer 201, the center computer 201 determines whether or not a value indicating existence of the personal data is set in the status area 412 in the entry.

Because the value indicating existence of the personal data is set in the status area 412 of the master data table 401 in the master database area 11 of the center computer 201, the center computer 201 reads and transmits the personal data (password and balance) from the managing file number address area 413 in the entry to the region center computer 211, and sets the identification number of the region center computer 211 in the status area 412 of the master data table 401 in its master database area 11 (step 85).

The region center computer 211 which receives the personal data of the customer with the personal registration number IDn from the center computer 201 registers the personal registration number IDn in the ID area 311 of the common data table 301 in its common database area 21, transmits the received personal data to the area center computer 221, and sets the identification number of the area center computer 221 in the status area 312 (step 86).

The area center computer 221 which receives the personal data of the customer with the personal registration number IDn from the region center computer 211 registers the personal registration number IDn in the ID area 311 of the common data table 301 in its common database area 21, transmits the received personal data to the group computer 231, and sets the identification number of the group computer 231 in the status area 312 (step 87).

The group computer 231 which receives the personal data of the customer with the personal registration number IDn from the area center computer 221 registers the personal registration number IDn in the ID area 311 of the common data table 301 in its common database area 21, sets in the status area 312 the value indicating existence of the personal data of the customer, and sets the password in the personal data in the password area 313 and the balance in the balance area 314.

The group computer 231 checks the password which is set in the password area 313 of the common data table 301 in its common database area 21, updates the balance set in the balance area 314, and notifies the updating terminal 241 of the result of the update for the personal data of the customer with the personal registration number IDn (step 88).

In this manner, the personal data of the customer with the personal registration number IDn stored in the master data table 401 in the master database area 11 of the center computer 201 is stored in the common data table 301 in the common database area 21 of the group computer 231, Thereafter, if the updating terminal 242 issues an update request for the personal data of the customer with the same personal registration number IDn, the group computer 231 receives the request, updates the personal data, and notifies the updating terminal 242 of the result of processing.

If the updating terminal 243 requests update for the personal data of the customer with the same personal registration number IDn, the group computer 232 accepts the request, and determines whether or not the personal registration number IDn of the customer is registered in the ID area 311 of the common data table 301 in its common database area 21.

If not, the group computer 232 requests the area center computer 221 to transmit the data of the customer with the personal registration number IDn.

The area center computer 221 which is requested by the group computer 232 to transmit the personal data of the customer with the personal registration number IDn determines whether or not the personal registration number IDn of the customer is registered in the ID area 311 of the common data table 301 in its common database area 21.

Since the personal registration number IDn is registered in the ID area 311 of the common data table 301 in the common database area 21 of the area center computer 221, and the identification number of the group computer 231 which is the computer holding the personal data of the customer with the personal registration number IDn is set in the status area 312, the area center computer 221 requests the group computer 231 to transmit the data of the customer with the personal registration number IDn.

The group computer 231 which is requested by the area center computer 221 to transmit the personal data of the customer with the personal registration number IDn searches for the personal registration number IDn in the ID area 311 of the common data table 301 in its common database area 21, reads the password from the password area 313 in the applicable entry and the balance from the balance area 314, transmits them as the personal data of the customer with the personal registration number IDn to the area center computer 221, and deletes all personal data of the customer with the personal registration number IDn from the common data table 301 in its common database area 21.

The area center computer 221 which receives the personal data of the customer with the personal registration number IDn from the group computer 231 sets the identification number of the group computer 232 in the status area 312 of the common data table 301 in its common database area 21, and transmits the received personal data to the group computer 232.

The group computer 232 which receives the personal data of the customer with the personal registration number IDn from the area center computer 221 registers the personal registration number IDn in the ID area 311 of the common data table 301 in its common database area 21, sets a value indicating existence of the personal data of the customer in the status area 312, and sets the password in the personal data in the password area 313 and the balance in the balance area 314.

The group computer 232 checks the password set in the password area 313 of the common data table 301 in its common database area 21, updates the balance set in the balance area 314, and notifies the updating terminal 243 of the result of update for the personal data of the customer with the personal registration number IDn.

Thus, the personal data of the customer with the personal registration number IDn stored in the common data table 301 in the common database area 21 of the group computer 231 is stored in the common data table 301 in the common database area 21 of the group computer 232.

Then, the process of the master data managing method of the first embodiment according to the invention is completed.

According to the master data managing method of the first embodiment of the invention, because the personal data held by the center computer is transmitted to a computer to which the terminal requesting update for the master data is attached, update is delayed for the first request as transfer of the master data takes time, but update is quickly processed for the second and subsequent requests.

In addition, there is an advantage that an update request from a terminal attached to a computer adjacent on the network to a computer to which the terminal updating the master data is attached is also quickly processed.

The second embodiment of the invention will be described with reference to FIGS. 5-7, and 10.

Figure 5:
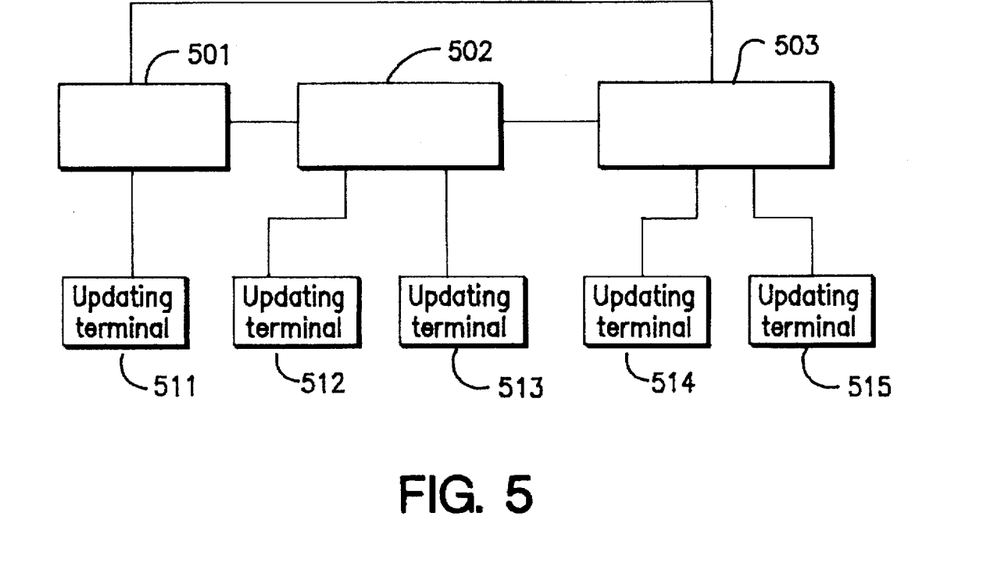
FIG. 5 is the configuration of a network system to which the master data managing method according to the second embodiment of the invention is applied.

Referring to FIG. 5, the second embodiment is a network system in which computers installed in branch offices of a company are connected through a loop communication line, the computer at each branch office (hereinafter called the "branch office computer") keeping and managing document data in a database.

An updating terminal 511 is attached to a branch office computer 501, updating terminals 512 and 513 are attached to a branch office computer 502, and updating terminals 514 and 515 are attached to a branch office computer 503. When an employee as an operator of each terminal operates an updating terminal of a branch office computer, he or she inserts his or her ID card on which his or her personal registration number is recorded in an ID card reader attached to the updating terminal so that the branch office computer can identify the employee as an operator.

The personal registration number includes the identification number of a computer installed in a branch office where the employee belongs.

Figure 6:
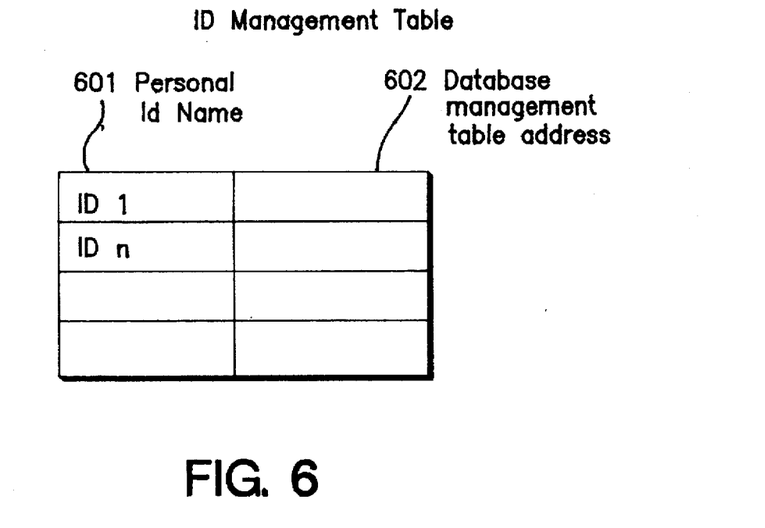
FIG. 6 is content of an ID management table of the second embodiment of the invention.

FIG. 6 shows content of an ID management table contained in a database area of each branch office computer.

Each entry (row) of the ID management table consists of a personal ID name area 601 in which the personal registration number of an employee is registered, and a database management table address area 602 in which the address of the database management table corresponding to the personal registration number is registered.

Figure 7:
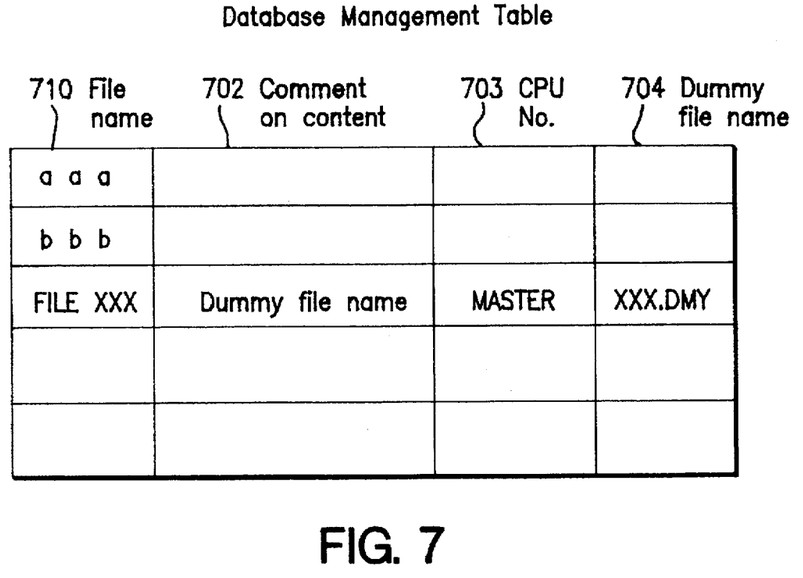
FIG. 7 is content of a database management table of the second embodiment of the invention.

FIG. 7 shows content of the database management table contained in the database area of each branch office computer.

The database management table is a table established for each personal registration number. Each entry (row) consists of a file name area 701 indicating the name of a data file, a comment area 702 storing comments on the content of database, a CPU number area 703 storing the identification number of a computer which manages the data file, and a dummy file name area 704 storing the file name of the data file in the computer in which the data file is stored.

In the embodiment, as shown in FIG. 6, the personal registration number IDn of an employee is registered in the personal ID name area 601 in the ID management table of the branch office computer 502, and the address of corresponding database management table is set in the database management table address area 602 of the entry corresponding to the personal registration number IDn.

In addition, as shown in FIG. 7, a file name "FILEXXX" is set in the file name area 701 in the database management table corresponding to the personal registration number IDn, "MASTER" indicating that the master data is held is set in the CPU number area 703 of the entry corresponding to the file name "FILEXXX," and a file name "XXX.DUMMY" is set in the dummy file name area 704 because the branch office computer 502 holds "FILEXXXI" in an alias "XXX.DUMMY."

Description is made of a case where, under such circumstances, an employee updates the file named "FILEXXX" from the updating terminal 511 attached to the branch office computer 501.

First, the employee with the personal registration number IDn has the ID card reader attached to the updating terminal 511 read his or her ID card, and the branch office computer 501 identifies him or her as the operator.

Figure 10:
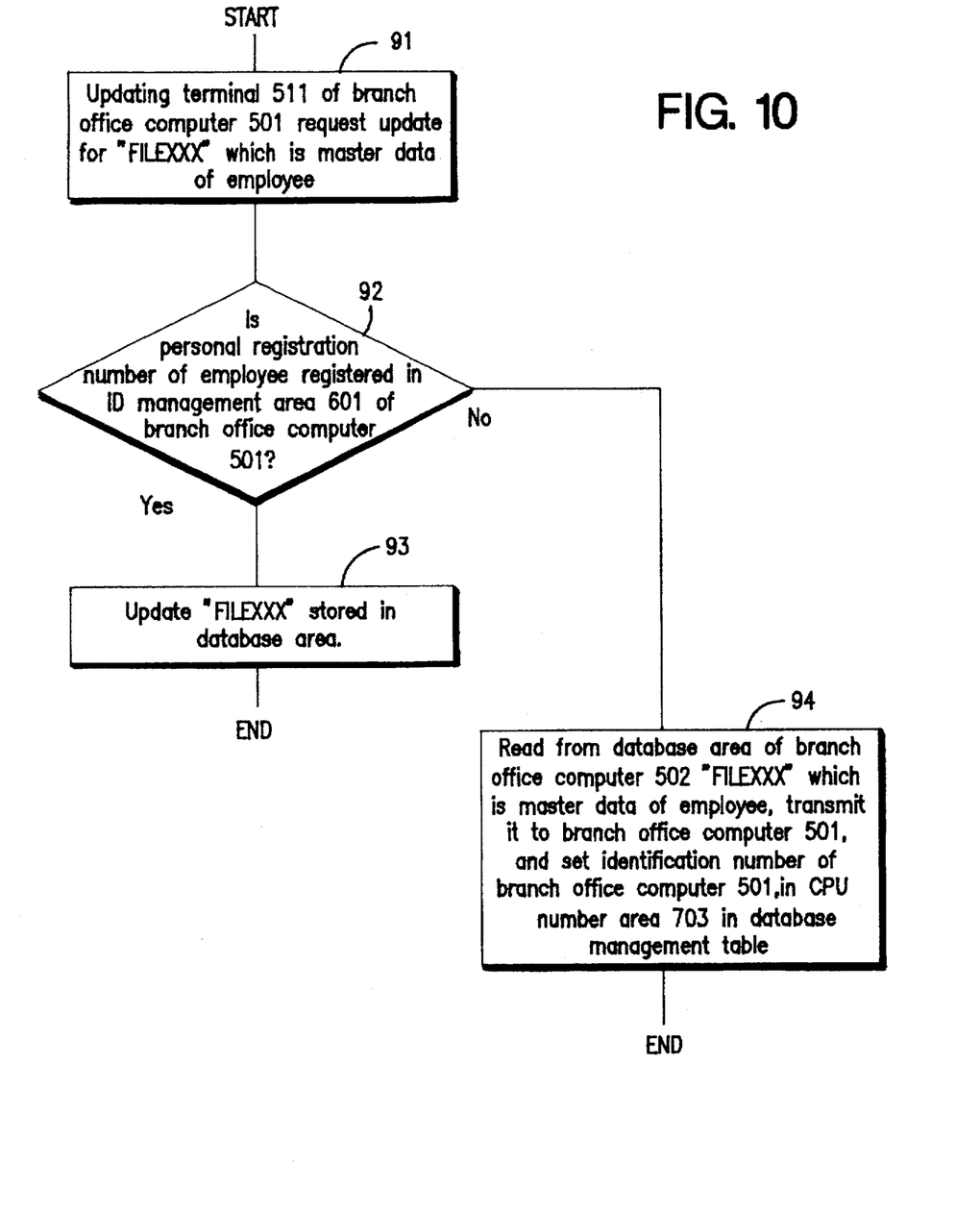
FIG. 10 is a flowchart illustrating the process of the master data managing method according to the second embodiment of the invention.

Then, when the employee requests update for the file named "FILEXXX" from the updating terminal 511 (step 91), the branch office computer 501 determines whether or not the personal registration number IDn of the employee is registered in the personal ID name area 601 in its ID management table (step 92).

If not, the branch office computer 501 recognizes from the personal registration number of the employee that the personal registration number of the employee is managed by the branch office computer 502, and requests the branch office computer 502 to transfer "FILEXXX."

The branch office computer 502 which is requested by the branch office computer 501 to transfer "FILEXXX" recognizes that the personal registration number IDn of the employee is registered in the personal ID name area 601 in its ID management table, and recognizes the database manageme table corresponding to the personal registration numb IDn of the employee from the address stored in the database management table address area 602 of the entry.

Then, the branch office computer 502 searches for the file name "FILEXXX" in the file name area 701 in the database management table, and recognizes a file with the dummy file name "XXX.DUMMY" set in the dummy file name area 704 as the master file from the fact that the CPU number area 703 of the entry is "MASTER."

Furthermore, the branch office computer 502 sets the identification number of the branch office computer 501 in the CPU number area 703 of the entry, and transfers the file "XXX.DUMMY" to the branch office computer 501 (step 93).

The branch office computer 501 to which the file "XXX.DUMMY" is transferred from the branch office computer 502 establishes a database management table corresponding to the personal registration number IDn, registers the personal registration number IDn in the personal ID name area 601 in its ID management table, and sets the address of the database management table in the database management table address area 602 of the corresponding entry.

Then, the branch office computer 501 registers the file name "FILEXXX" in the file name area 701 of the created database management table, sets "MASTER" in the CPU number area 703 of the entry, and sets the dummy file name "XXX.DUMMY" in the dummy file name area 704 of the entry.

Furthermore, the branch office computer 501 stores the file "XXX.DUMMY" in its database area, and then processes update (step 94).

Thereafter, if the employee with the personal registration number IDn requests update for the file named "FILEXXX" from the updating terminal 515 attached to the branch office computer 503, the branch office computer 503 determines whether or not the personal registration number IDn of the employee is registered in the personal ID name area 601 in its ID management table.

If not, the branch office computer 503 recognizes from the personal registration number IDn of the employee that the personal registration number IDn of the employee is managed by the branch office computer 502, and requests the branch office computer 502 to transfer "FILEXXX."

The branch office computer 502 which is requested by the branch office computer 503 to transfer "FILEXXX" recognizes that the personal registration number IDn of the employee is registered in the personal ID name area 601 in its ID management table, and recognizes the database management table corresponding to the personal registration number IDn of the employee from the address stored in the database management table address area 602 of the entry.

Then, the branch office computer 502 searches for the file name "FILEXXX" in the file name area 701 in the database management table, and notifies the branch office computer 503 of the fact that "FILEXXX" is held by the branch office computer 501 because the CPU number area 703 of the entry indicates the identification number of the branch office computer 501.

The branch office computer 503 which is notified by the branch office computer 502 of the fact that "FILEXXX" is in the branch office computer 501 requests the branch office computer 501 to transfer "FILEXXX."

The branch office computer 501 which is requested to transfer "FILEXXX" from the branch office computer 503 recognizes that the personal registration number IDn of the employee is registered in the personal ID name area 601 in its ID management table, and recognizes the database management table corresponding to the personal registration number IDn of the employee from the address stored in the database management table address area 602 of the entry.

The branch office computer 501 searches for the file name "FILEXXX" in the file name area 701 in the database management table, and recognizes a file with the dummy file name "XXX.DUMMY" set in the dummy file name area 704 as the master file from the fact that the CPU number area 703 of the entry is "MASTER."

Furthermore, the branch office computer 501 sets the identification number of the branch office computer 503 in the CPU number area 703 of the entry, and transfers the file "XXX.DUMMY" to the branch office computer 503.

The branch office computer 503 to which the file "XXX.DUMMY" is transferred from the branch office computer 501 establishes a database management table corresponding to the personal registration number IDn, registers the personal registration number IDn in the personal ID name area 601 in its ID management table, and sets the address of the database management table in the database management table address area 602 of the corresponding entry.

Then, the branch office computer 503 registers the file name "FILEXXX" in the file name area 701 of the created database management table, sets "MASTER" in the CPU number area 703 of the entry, and sets the dummy file name "XXX.DUMMY" in the dummy file name area 704 of the entry.

Furthermore, the branch office computer 503 stores the file "XXX.DUMMY" in its database area, and then processes update.

After completion of update, the branch office computer 503 notifies the branch office computer 502 of the fact that it holds "FILEXXX."

The branch office computer 502 which is notified by the branch office computer 503 of holding of "FILEXXX" searches for the file name "FILEXXX" in the file name area 701 in the database management table, and sets the identification number of the branch office computer 503 in the CPU number area 703 of the entry.

Then, the process of the master data managing method of the second embodiment according to the invention is completed.

According to the master data managing method of the second embodiment of the invention, because, when any one of updating terminals attached to computers connected by a loop network requests update for any file, the file is transmitted to the requesting computer, the update can be quickly processed.

As described, a feature of the master data managing method of the invention lies in that, in a network system in which a master computer holding the master data and a plurality of local computers are hierarchically connected through a communication line, when a terminal attached to any one of the local computers requests update for the master data, the master data is transmitted to the requesting local computer from the master computer through multiple local computers.

In addition, another feature of the master data managing method of the invention lies in that, in a network system in which a plurality of computers is connected through a loop communication line, and one of them holds the master data, when a terminal attached to any one of the computers requests update for the master data, the master data is transmitted to the requesting computer from a computer holding the master data.

With these features, the master data managing method of the invention has an advantage that an update request from any terminal attached to any computer constituting the network can be efficiently processed.

In addition, there is an advantage that the response is not delayed for an update request for the master data from any terminal attached to any computer constituting the network.

Although the invention has been described in detail above in connection with various preferred embodiments thereof, it will be appreciated by those skilled in the art that these embodiments have been provided solely for purpose of illustration, and are in no way to be considered as limiting the invention. Instead, various modifications and substitutions of equivalent techniques will be readily apparent to those skilled in the art upon reading this specification, and such modifications and substitutions are to be considered as falling within the true scope of the following claims.

What is claimed is:

1. A method for managing data transfer in a computer network composed of a plurality of interconnected computers, comprising:

removing data from a first computer and transferring said data to a second computer, and storing information in said first computer indicating that said data is now located in said second computer; and removing said data from said second computer and transferring said data to a third computer via said first computer by locating said data using said information stored in said first computer.

2. A method for managing master data held by at least one of a plurality of computers interconnected to form a network, comprising the steps of:

commanding a first of said computers to remove said master data from said first computer and transfer said data to a requesting one of said computers;

if said first computer holds said master data, removing said master data from said first computer and transferring said master data to said requesting computer, storing in said first computer information indicating to which of said computers said master data has been transferred, and storing said master data in said requesting computer; and if said first computer does not hold said master data, determining a second of said computers which holds said master data, based on said information stored in said first computer indicating to which of said computers said master data has been transferred, and removing said master data from said second computer and transferring said master data to said requesting computer.

3. The method of claim 2, further comprising:

commanding said first computer to process said master data;

processing said master data held by said first computer, when said first computer holds said master data; and determining a second of said computers which holds said master data, based on said information stored in said first computer indicating to which of said computers said master data has been transferred, and processing said master data held by said second computer, when said first computer does not hold said master data.

4. The method of claim 2, wherein a third computer which does not hold said master data is interposed between said first and second computers, and said determining step further comprises said first computer instructing said third computer to send said master data, said third computer relaying said request to said second computer, said second computer transferring said master data to said third computer, and said third computer relaying said master data to said first computer.

5. A method for managing master data held by at least one of a plurality of computers interconnected to form a network, said computers including a top-level computer initially holding said master data and a plurality of low-level computers connected at levels lower than said top-level computer, comprising:

commanding a first of said computers to remove said master data from said first of said computers and transfer said master data to a requesting computer;

if said first computer holds said master data, removing said master data from said first computer and transferring said master data to said requesting computer, storing in said first computer information indicating to which of said computers said master data has been transferred, and storing said master data in said requesting computer;

if said first computer does not hold said master data and said information indicating to which of said computers said master data has been transferred is stored in said first computer, determining a second of said computers which holds said master data, based on said information stored in said first computer indicating to which of said computers said master data has been transferred, and removing said master data from said second computer and transferring said master data to said requesting computer; and if said first computer does not hold said master data and said information indicating to which of said computers said master data has been transmitted is not stored in said first computer, determining a second of said computers which holds said master data among at least one computer connected at a level higher than said first computer, removing said master data from said second computer and transferring said master data to said requesting computer.

6. The method of claim 5, further comprising:

commanding said first computer to process said master data;

processing said master data held by said first computer, when said first computer holds said master data;

determining a second of said computers which holds said master data, based on said information stored in said first computer indicating to which of said computers said master data has been transferred, and processing said master data held by said second computer, when said first computer does not hold said master data and said information indicating to which of said computers said master data has been transferred is stored in said first computer; and determining a second of said computers which holds said master data among at least one computer connected at a level higher than said first computer, and processing said master data held by said second computer, when said first computer does not hold said master data and said information indicating to which of said computers said master data has been transferred is not stored in said first computer.

7. A method for managing master data held by at least one of a plurality of computers interconnected to form a network, said network forming a loop, comprising the steps of:

commanding a first of said computers to remove said master data from said first of said computers and transfer said master data to a requesting computer;

if said first computer holds said master data, removing said master data from said first computer and transferring said master data to said requesting computer, storing in said first computer information indicating to which of said computers said master data has been transferred, and storing said master data in said requesting computer;

if said first computer does not hold said master data and said information indicating to which of said computers said master data has been transmitted is stored in said first computer, determining a second of said computers which holds said master data, based on said information stored in said first computer indicating to which of said computers said master data has been transferred, and removing said master data from said second computer and transferring said master data to said requesting computer; and if when said first computer does not hold said master data and said information indicating to which of said computers said master data has been transmitted is not stored in said first computer, determining a second of said computers which holds said master data, based on information indicating to which of said computers a user possessing said master data belongs, and removing said master data from said second computer and transferring said master data to said requesting computer.

8. The method of claim 7, further comprising:

commanding said first computer to process said master data;

processing said master data held by said first computer, when said first computer holds said master data;

determining a second of said computers which holds said master data, based on said information stored in said first computer indicating to which of said computers said master data has been transferred, and processing said master data held by said second computer, when said first computer does not hold said master data and said information indicating to which of said computers said master data has been transferred is stored in said first computer; and determining a second of said computers which holds said master data, based on said information indicating to which of said computers a user possessing said master belongs, and processing said master data held by said second computer, when said first computer does not hold said master data and said information indicating to which of said computers said master data has been transferred is not stored in said first computer.

* * * * *